United States Patent

[11] 3,579,085

[72] Inventor Robert Grodinsky
    Skokie, Ill.
[21] Appl. No. 759,742
[22] Filed Sept. 13, 1968
[45] Patented May 18, 1971
[73] Assignee Acoustic Research, Inc.
    Cambridge, Mass.

[54] POWER SUPPLY FOR PROVIDING MAIN AND STANDBY SOURCES OF POWER
    5 Claims, 2 Drawing Figs.

[52] U.S. Cl.................................................. 321/27,
    315/101, 328/262, 330/199
[51] Int. Cl........................................................ H02m 7/00,
    H03f 1/00
[50] Field of Search.................................... 321/27, 18,
    20; 330/127, 199, 200; 328/262, 265; 315/101;
    307/45, 58

[56] References Cited
    UNITED STATES PATENTS

| | | | | |
|---|---|---|---|---|
| 3,496,446 | 2/1970 | Griffey | | 315/101X |
| 3,500,169 | 3/1970 | Ibsen | | 321/27 |
| 3,514,532 | 5/1970 | Ludlam | | 315/101X |
| 2,891,209 | 6/1959 | Schalk | | 321/20(UX) |
| 2,969,494 | 1/1961 | Davis | | 321/20X |
| 3,470,451 | 9/1969 | Arase | | 321/18 |
| 2,875,397 | 2/1959 | Parks | | 321/27X |
| 3,289,069 | 11/1969 | Todd | | 321/18 |

FOREIGN PATENTS

| | | | |
|---|---|---|---|
| 707,060 | 1/1962 | Canada | 315/101 |
| 855,580 | 12/1969 | Great Britain | 321/27 |
| 1,126,494 | 3/1962 | Germany | 321/27 |

*Primary Examiner*—William H. Beha, Jr.
*Attorney*—Robert J. Schiller

ABSTRACT: A power supply for high-fidelity amplifier and having a pair of full-wave rectifiers, one with its input permanently connected to line power, the other with a switch for connecting and disconnecting it to line power. The output of the auxiliary rectifier is fed to an input terminal for the amplifier so that portions of the latter can be kept energized at low levels. The other or main rectifier is connected to a regulator to provide a regulated supply and the output of the latter is diode connected to the output of the auxiliary rectifier so that when the main rectifier is turned on it will supply all of the necessary power to all portions of the amplifier.

Patented May 18, 1971

3,579,085

ROBERT GRODINSKY
INVENTOR.

BY Robert J. Schiller

POWER SUPPLY FOR PROVIDING MAIN AND STANDBY SOURCES OF POWER

This invention relates to power supplies for amplifiers and particularly to power supplies for high-fidelity transistor amplifiers.

In many transistor amplifiers, when first turned on, a turn-on noise such as a thump or burst of hum occurs. Although ordinarily this is no particular problem, for high-fidelity amplifiers where the user is often highly conscious of extraneous sounds, the turn-on noise can be annoying and even a sales deterrent.

The present invention therefore has as its principle object the provision of a power supply which overcomes the foregoing problem.

This and other objects of the present invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Generally, the present invention contemplates the provision of the usual power supply for an amplifier and means for energizing and deenergizing this primary supply. A small auxiliary power supply is included and is intended to be kept energized at all times. Means are provided for connecting the outputs of both power supplies to the output amplifier and included are switching means for automatically decoupling the auxiliary supply from the primary supply when the latter becomes inoperative.

Figure 1:
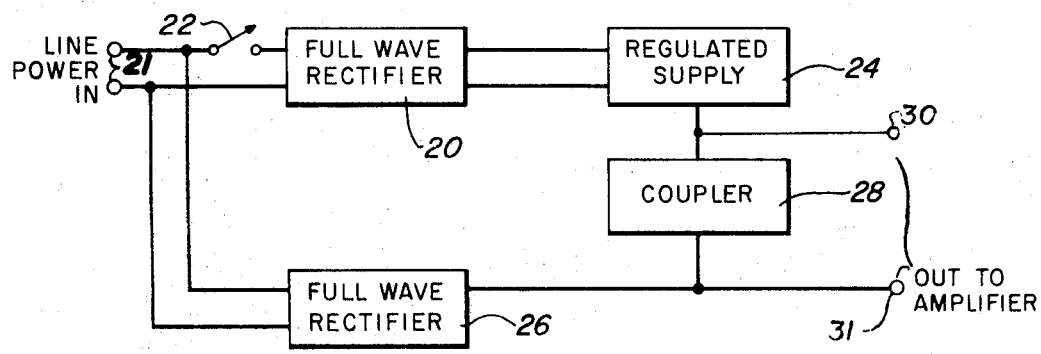
FIG. 1 is a generalized block diagram of the present invention.

Referring now to FIG. 1. there is shown a block diagram of the invention comprising first rectifier 20, typically a full-wave rectifier which is connectable through on-off switch 22 to a pair of terminals at which a source of line power can be applied. The output of rectifier 20 is connected to means, such as supply 24, for regulating the power output from rectifier 20. Also included is second rectifier 26 connected to terminals 21, preferably permanently. The output of rectifier 26 is connected at terminal 31, and the output of regulated supply 24 is connected to output terminal 30 and is connectable to terminal 31 through coupler 28.

In operation, assuming line power applied to terminals 21 and switch 22 open, rectifier 26 provides an output, for example a limited B plus power supply for an amplifier, at terminal 31. The power supplied at terminal 31 typically can be very low and need only be sufficient to keep critical driver circuits of the amplifier in an idling condition and the capacitors near full charge. Thus terminal 31 need only be connected to these critical circuits. Now when the main power supply switch 22 is turned on, it cuts rectifier 20 into circuit and thus provides a rectified DC to the input of regulator. The latter in the usual manner, controls the magnitude and filters the DC, to provide regulated power which in turn is applied both to coupler 28 and output terminal 30. The coupler is preferably responsive to the output of supply 24 to connect the latter to terminal 31 as well. If now terminal 30 is connected to all other circuits of the amplifier, then the operation of rectifier 20 provides the entire amplifier with power.

Figure 2:
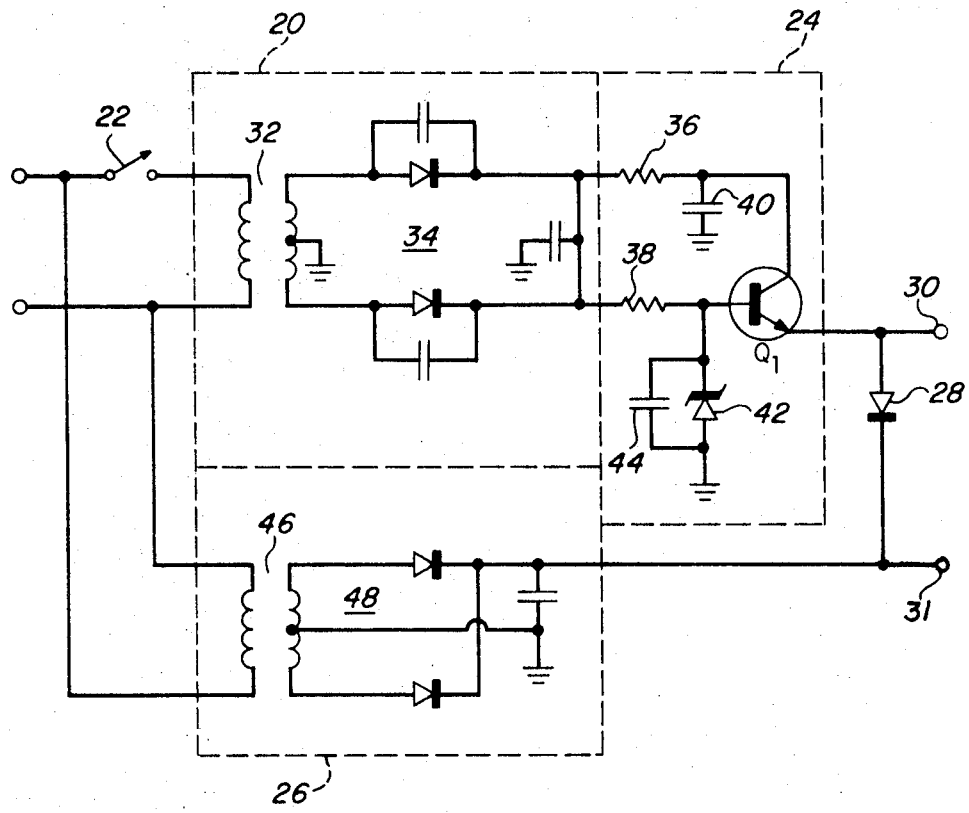
FIG. 2 is a schematic circuit diagram of an embodiment of FIG. 1.

A simple implementation of the device of FIG. 1 is shown in FIG. 2 wherein like numerals denote like parts. Rectifier 20 is shown as a full-wave bridge 34 having an input transformer 32. The secondary winding of the latter is center tapped to ground and each end of the secondary, in the usual manner is connected to the cathode of a respective diode. The diodes each have the usual RF bypass capacitor associated therewith. The diode cathodes are connected to one another and trough the usual filter capacitor to ground. Such full-wave bridges are well known in the art and need no further description here.

Regulator 24 in the form shown, comprises NPN transistor $Q_1$, the collector of which is connected through power-limiting resistor 36 to the diode cathodes of bridge 34. An RF bypass capacitor 40 is connected between the collector of transistor $Q_1$ and ground. The base of transistor $Q_1$ is connected through series limiter resistor 38 to the diode cathodes of bridge 34, and is of course considerably greater in ohmic value than resistor 36. The emitter of transistor $Q_1$ is connected to output terminal 30. Importantly as usual, the base of transistor $Q_1$ is clamped to ground through an RC tank comprising filter capacitor 44 shunting Zener diode 42. Transistor $Q_1$ is preferably connected as an emitter follower and thus the combination of rectifier 20 and regulator 24 provides a low impedance power source.

Rectifier 26 in the simple form shown includes transformer 46 having its secondary winding connected to full-wave bridge 48 which is quite similar to bridge 34 except that it need provide much less power at its output. The coupled cathodes of bridge 48 are connected to the cathode of coupling diode 28, and to terminal 31. The anode of diode 28 is connected to terminal 30.

Now assuming line power at the primary of transformer 46 and switch 22 open, it will be apparent that a positive rectified DC will be provided at terminal 31 by bridge 48. Because diode 28 blocks this DC power, the latter will not appear at terminal 30. Terminal 31 then typically can be connected to those circuits of an amplifier system that can or should be allowed to idle, such as preamplifier transistors and the like. Large power consuming units such as power amplifiers and the like that need not be kept idling to avoid hum, should be connected to terminal 30.

Now when one wishes fully to operate the amplifier system, one need only turn it "on" by closing switch 22. This of course energizes transformer 32, and bridge 34 then provides a rectified, filtered DC to transistor $Q_1$. This main DC signal, regulated by the combined action of Zener diode 42 and the transistor is applied to terminal 30. Additionally, the circuit elements are so selected that the signal at terminal 30 is more positive than the DC provided by bridge 48, hence diode 28 becomes forward biased and the current from transistor $Q_1$ is summed at terminal 31 with the DC from bridge 48. By providing the voltage output of bridge 48 as a low level signal compared to that form transistor $Q_1$, the small contribution of unregulated output from bridge 48 is not objectionable. Also, because of the low impedance provided by the emitter follower configuration of transistor $Q_1$, the large bulk of current drawn will be through bridge 34.

Since certain changes may be made in the above apparatus without departing from the scope of the invention herein involved it is intended that all matter contained in the above description or shown in the accompanying drawing shall be interpreted in an illustrative and not in a limiting sense.

I claim:

1. A power supply apparatus comprising in combination:

input terminal means to which may be applied a source of power;

first rectifier means connected at its input to said terminal means;

second rectifier means;

means coupled to said second rectifier means for regulating the magnitude of the DC output from said second rectifier means;

switching means for selectively connecting and disconnecting said second rectifier means from said terminal means; and diode means for coupling the outputs of both said regulating means and said first rectifier means, said diode means being poled to conduct only when said second rectifier means is energized upon connection of the latter to said terminal means thereby isolating said first rectifier means from current drain when said second rectifier means is both connected and disconnected from said terminal means.

2. A power supply apparatus as defined in claim 1 wherein said rectifier means comprise full-wave, bridge rectifiers.

3. A power supply apparatus as defined in claim 1 wherein said second rectifier means is a lower impedance source than said first rectifier means.

4. A power supply apparatus as defined in claim 1 wherein
said first rectifier means comprises a first full-wave rectifier bridge,
said second rectifier means comprises a second full-wave rectifier bridge connected to a low output impedance power regulating means,
said means for selectively connecting is a switch, and
said means for coupling comprises a diode connected between the outputs of said regulating means and said first rectifier bridge and poled to conduct only when said second bridge is energized upon closure of said switch.

5. A power supply apparatus for supplying a main and a standby source of power, said apparatus comprising, in combination:
input terminal means to which may be applied a source of AC power;
first and second output terminals;
first rectifier means connected at its input to said terminal means for providing a standby DC signal to said first of said output terminals;
second rectifier means for providing a main DC signal when connected to said input terminal means;
means coupled between said second rectifier means and said second of said output terminals for regulating the magnitude of the DC output from said second rectifier means, when connected to said input terminal means;
switching means for selectively connecting and disconnecting said second rectifier means from said input terminal means; and
diode means for coupling the outputs of both said regulating means and said first rectifier means, said diode means being poled to conduct so as to apply the output of said regulating means to said second output terminal and the output of said regulating means together with the output of said first rectifier means to said first output terminal only when said second rectifier means is energized to provide said main DC signal upon connection of the latter to said input terminal means thereby isolating said first rectifier means from current drain when said second rectifier means is both connected and disconnected from said terminal means.